Figure 3:
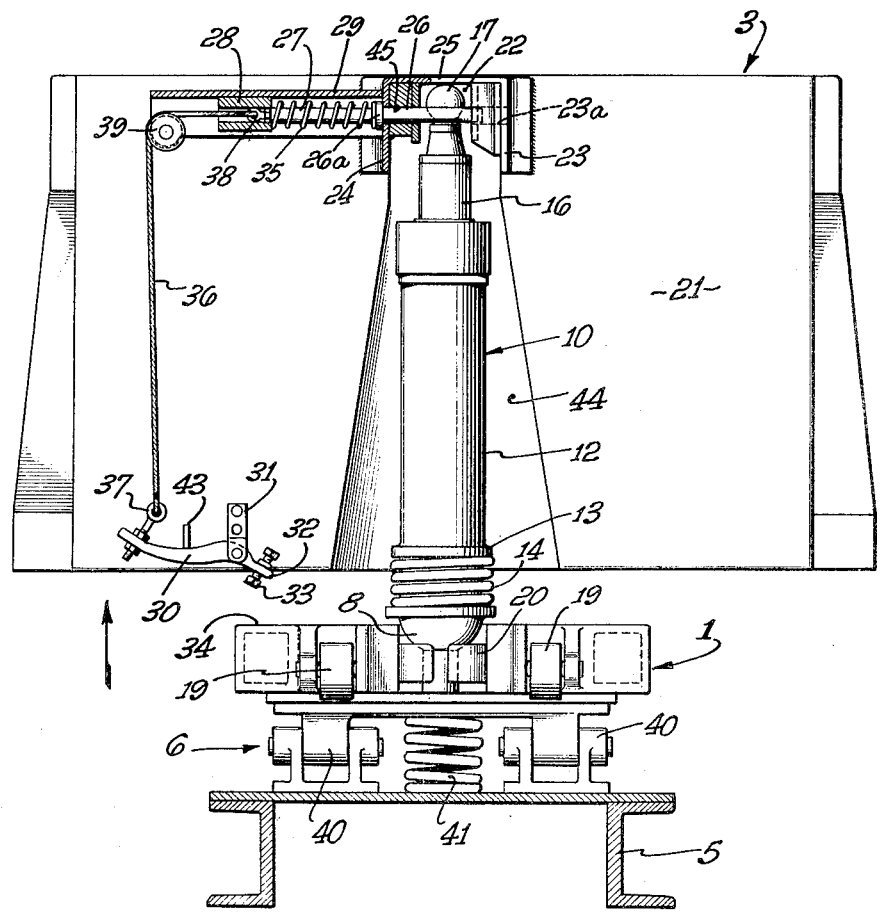

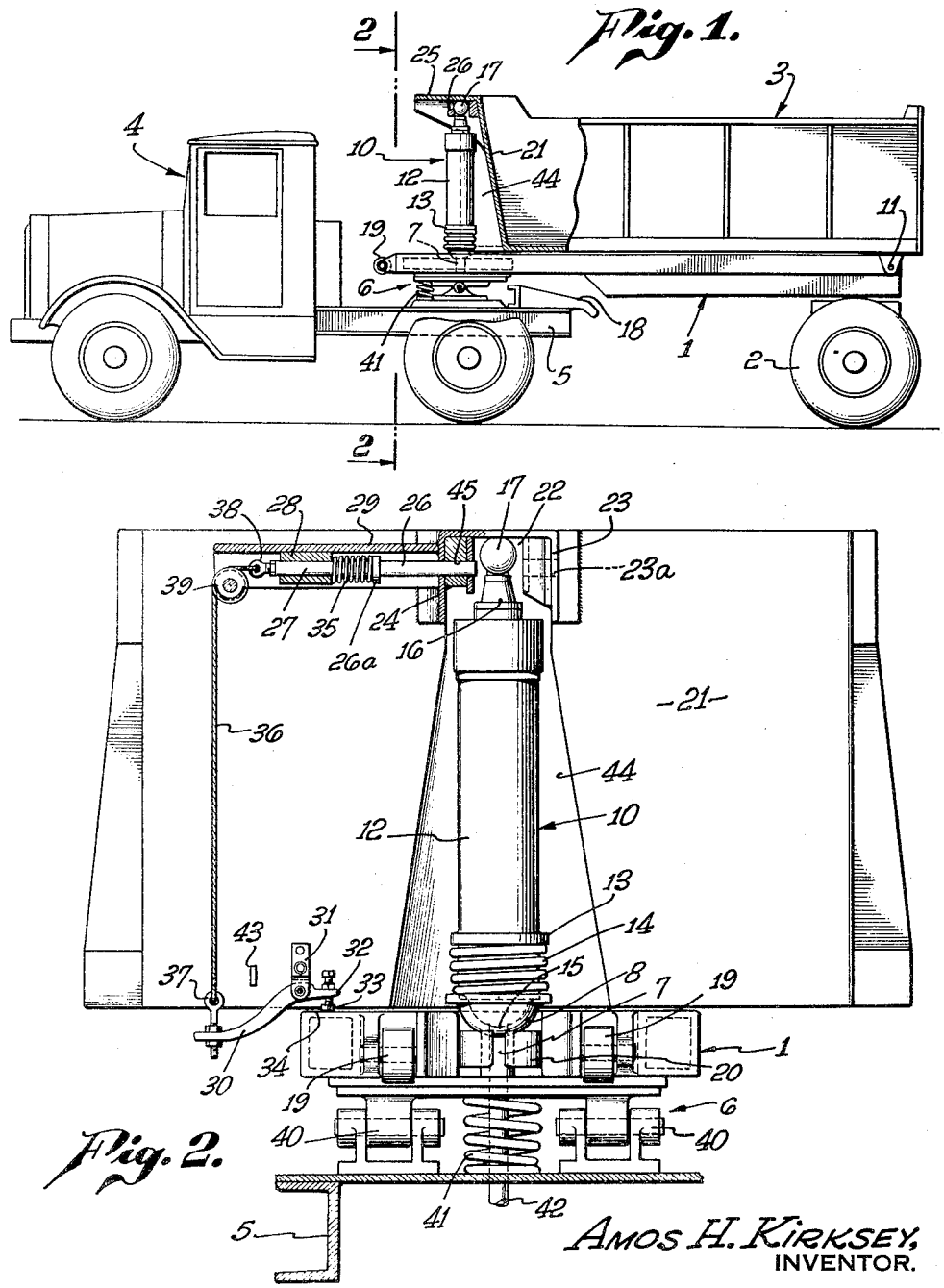

Jan. 23, 1951     A. H. KIRKSEY     2,539,086
HEADLOCK FOR DUMPING HOISTS

Filed Dec. 18, 1944     2 Sheets-Sheet 2

AMOS H. KIRKSEY,
INVENTOR.

BY *Francis D. Ammen*
    his ATTORNEY.

Patented Jan. 23, 1951

2,539,086

UNITED STATES PATENT OFFICE 2,539,086

HEADLOCK FOR DUMPING HOISTS

Amos H. Kirksey, Los Angeles, Calif.

Application December 18, 1944, Serial No. 568,695

11 Claims. (Cl. 298—1)

This invention relates to dumping trucks or the like and while features of the invention are applicable to dumping trucks of many different types, in the present specification the invention is described as applied to a type of truck in which the body of the truck is mounted on a trailer frame. This type of apparatus is referred to in my prior application for patent, Serial No. 186,839, filed January 25, 1938, which is now issued into Patent No. 2,166,722, granted to me on the 18th day of July, 1939.

In this type of truck a hoist is employed, the lifting head of which engages the forward end of the truck or trailer body so as to raise the same when the load is to be dumped.

One of the objects of this invention is to provide means for locking the lifting head of the hoist to the truck body so that regardless of the extent to which the hoist is extended, the lifting head will still maintain operative connection to the dumping body.

As stated above, the invention is particularly applicable in a type of material carrying and dumping apparatus, in which a towing vehicle or truck is employed that can be backed into position under the forward end of the trailer, the trailer frame being provided with automatic means for effecting a coupling or connection to the fifth wheel on the rear end of the towing vehicle. Associated with the fifth wheel and preferably above the same a hoist extends upwardly, and when the towing vehicle is backed into position to couple it to the trailer frame, the lifting head of this hoist passes into a pocket at the forward end of the trailer body. One of the objects of this invention is to provide means for facilitating the movement of the lifting head of the hoist back into this pocket, and to provide automatic means for retaining the lifting head in this pocket.

Another object of the invention is to provide automatically operated locking means such as described which is brought into operation, so as to bar, or close, the forward end of the pocket automatically when the hoist commences to lift the forward end of the trailer body.

Further objects of the invention will appear hereinafter.

The invention consists in the novel parts and combination of parts, to be described hereinafter, all of which contribute to produce an efficient head lock for a dumping hoist.

A preferred embodiment of the invention is described in the following specification, while the broad scope of the invention is pointed out in the appended claims.

In the drawings:

Fig. 1 is a side elevation and partial section illustrating a towing vehicle and coupled trailer to which my invention has been applied. In this view the forward end of the trailer body is shown in cross-section.

Fig. 2 is a front elevation of the forward end of the trailer body and trailer frame, and also showing a portion of the fifth wheel in elevation with some parts in cross section. In this view also a portion of the locking mechanism is shown as viewed in section on a vertical plane extending longitudinally with the locking bolt. This view shows the locking mechanism held in its open position to facilitate the entrance of the lifting head of the hoist into the lifting pocket at the forward end of the trailer body.

Fig. 3 is a view similar to Fig. 2 but showing the hoist at the commencement of its lifting movement and illustrating how the incidental initial lifting movement of the front end of the trailer body enables the locking mechanism to act automatically to lock or retain the lifting head in its pocket.

Referring more particularly to the parts, Fig. 1 illustrates a rear frame or trailer frame 1 mounted on rear wheels 2 and supporting a dumping body 3. This body is movably mounted on the trailer frame in such a way that it can be lifted at its forward end to dump the load off its bottom. This type of trailer is intended to cooperate with a towing vehicle or truck 4 having a frame 5 forward of the frame 1, and this frame 5 supports a fifth-wheel construction 6. This fifth wheel construction includes a "kingpin" 7 which extends up from the fifth wheel and is actually a rigid neck extending down from a bowl or socket 8 which operates to support the rounded nose that forms the lower end of the hoist 10 (see Fig. 2). This nose, and the bowl or socket 8 operate to give a considerable freedom of movement to the hoist, permitting it to swing toward the rear as the trailer body 3 swings upwardly on its pivotal connection 11 that supports it on the rear end of the trailer frame 1.

The hoist 10 includes an outer casing or tubular shell 12 presenting an annular flange 13 near its lower end against which a coil spring 14 thrusts so as to hold the rounded nose down against the spherical inner face of the socket or bowl 8. This prevents the escape of air that is admitted through a central opening 15 in the nose to permit this air or other operating fluid to exert its force against a piston or pistons (not illustrated) within the hoist, so as to extend an inner piston rod 16 carrying a lifting head 17.

This truck or towing vehicle 4 is provided with the usual inclined guide or ramp 18 at the rear end which cooperates with a pair of rollers 19 on the forward end of the trailer frame when it moves up, and into position over the fifth wheel; and so as to enable a pair of opposed jaws 20 to engage on opposite sides of the kingpin or neck 7. These jaws operate to couple the trailer frame to the fifth wheel.

In order to effect an operative connection between the lifting head 17 and the forward end of the trailer body 3 the forward wall 21 of the trailer body is formed with an elevated pocket 22 that is open at its forward end and provided with side walls 23 and 24. This pocket 22 provides a projecting cover wall 25 that is adapted to overlie the lifting head 17 and take its thrust when the trailer has been coupled to the towing vehicle or truck 4.

In applying my invention to apparatus of this kind I provide locking means that is mounted so that a part of it can obstruct the mouth of the pocket. In the present instance this part can be projected across the mouth of the pocket 22 in front of the lifting head 17 after the lifting head has come into position as indicated in Fig. 1. In order to accomplish this, I prefer to provide a draw bolt 26 which is guided through the side walls 23 and 24 of the pocket 22, and this bolt is preferably formed with a tail rod or shank 27 that is guided to slide through a guide block 28 secured by welding or otherwise to the under side of a laterally disposed bracket plate 29.

This locking means is constructed so that it will cooperate with the lifting head 17 to permit the lifting head to pass rearwardly into the pocket 22, but thereafter, and as soon as the forward end of the trailer body lifts, operating to lock the lifting head in the pocket. This is preferably accomplished automatically through suitable details of construction for this locking bar or bolt 26. In the present instance I provide a control member 30 which is a lever pivotally mounted to swing in a substantially vertical plane on a bracket 31 secured to the forward wall 21 of the trailer body. This lever has a short arm 32 with an adjustable contact device or bolt 33 having a head at its lower end that will be engaged by the upper face 34 of the forward end of the trailer frame 1 when the truck 4 is being backed into position to couple it to the trailer. Before the lever 30 is engaged by the forward end of the trailer truck it will occupy substantially the position that is indicated in Fig. 3 at which the time the draw bolt 26 will lie projected across the mouth of the pocket 22, but when the face 34 strikes this bolt 33 it will swing the long arm of the lever downwardly, and this will withdraw the bolt 26 against the force of the return spring 35 which is associated with the bolt. This is a coil spring, one end of which thrusts against the end of the guide block 28 and the other end of which thrusts against an integral collar 26a formed on the draw bolt.

Any suitable means such as a flexible wire or cord 36 may be employed for connecting the long end of the lever 30 to the rear end of the bolt 22. The ends of this pull wire or cord are attached to eyebolts 37 and 38 which are adjustably secured respectively in the lever 30 and the rear end of the shank 27. The pull wire or cord 30 is guided around a suitable sheave or guide pulley 39.

In order to enable the forward end of the trailer frame 1 to ride up over the fifth wheel when it passes off of the upper face of the ramp 18, the fifth wheel 6 is mounted in the usual manner on aligning pivotal bearings 40 (see Figs. 2-3) that are located respectively towards the sides of the fifth wheel, a coil spring 41 being provided under the fifth wheel as shown.

The operating fluid for the hoist, such as compressed air, is supplied through the lower end of the coupling neck or kingpin 7 by a hose connection 42 that passes up through clearance openings in the fifth wheel so as to deliver the air to a central duct, passing up through the neck 7 and which delivers the operating fluid through the aforesaid port or opening 15.

In order to hold the lever 30 in its position of rest as shown in Fig. 3, I prefer to provide a stop 43 that projects out from the forward wall 21. The spring 35, of course, holds this lever 30 up against this stop and so that the forward end of the bolt 26 will lie in the guide opening 23a in the wall 23. A similar guide opening or bore 45 for the draw bolt is provided in the other side wall 24 of the pocket 22.

I have described how the control member or lever 30 operates automatically to open the pocket 22, by withdrawing the bolt 26 when the truck 4 is being backed into position under the forward end of the trailer frame 1. This control member also operates automatically to permit the locking means such as the bolt 26 to move into its locking position as soon as the trailer body 3 swings up at its forward end toward its elevated dumping position. In other words, as soon as the lower end of the bolt 33 moves away from the face 34 on the trailer frame, the spring 35 will commence to extend the bolt 26 across the mouth of the pocket 22. From inspection of Fig. 2 it is evident that it is only necessary for the lever 30 to swing through a comparatively small angle in order for the bolt 26 to be projected all the way across the mouth of the pocket 22.

In order to increase the carrying capacity of the trailer body 3, I prefer to form the forward wall 21 with a recess 44 (see Fig. 2). This will form extensions or laterally disposed chambers at the forward end of the body 3 which can receive a part of the load.

Many other embodiments of this invention may be resorted to without departing from the spirit of the invention.

I claim and desire to secure by Letters Patent:

1. In a dumping apparatus of the kind described, the combination of a forward wheeled frame with a fifth wheel mounted on the same, a rear wheeled frame supported at its forward end on the fifth wheel, means for coupling the forward frame to the rear frame, a dumping body pivotally supported on said rear frame at the rear portion thereof, a substantially vertical hoist cylinder supported by the forward wheeled frame and having an upwardly extensible lifting head, said dumping body having a pocket located at its forward end in an elevated position above the said lifting head, said pocket having side walls adapted to receive the lifting head between the same when the forward wheeled frame and the rear wheeled frame are coupled together, and locking means associated with said side walls, with means for moving the locking means to retain the lifting head in the pocket.

2. In dumping apparatus of the kind described, the combination of a towing vehicle having a rearwardly extending frame, a fifth-wheel mounted above the said frame and supported thereon, a hoist associated with the fifth-wheel, and including an extensible lifting head guided to move in a substantially vertical direction, a rear frame having means at the forward end for engaging the fifth-wheel to support the rear frame thereon, a dumping body mounted on the rear frame and having a forwardly disposed pocket adapted to receive the said lifting head by a substantially horizontal movement of the lifting head when the towing vehicle is backed under the forward end of the rear frame, and locking means including a locking member located at said pocket, with means for moving the same into position for retaining the lifting head in the pocket when the hoist is to be extended to dump the load in the body.

3. In dumping apparatus of the kind described, the combination of a trailer having a frame with a dumping body supported thereon, said dumping body having a forward wall with a pocket associated with said forward wall, a towing vehicle having a fifth wheel, a hoist including a substantially upright fluid operated hoisting cylinder, said hoist having a lifting head adapted to pass into the said pocket from the front when the vehicle is backed under the forward end of the truck frame; said pocket having side walls; a bolt guided in said side walls to extend across said pocket to retain the lifting head therein, and automatic means for effecting the passage of the lifting head past the location of the bolt when the head passes back into the pocket.

4. In dumping apparatus of the kind described, the combination of a towing vehicle having a rearwardly extending frame, a fifth-wheel mounted above the said frame and supported thereon, a hoist associated with the fifth-wheel, and including an extensible lifting head guided to move in a substantially vertical direction, a rear frame having means at the forward end for engaging the fifth-wheel to support the rear frame thereon, a dumping body mounted on the rear frame and having a forwardly disposed pocket open on its forward side adapted to receive the said lifting head by a substantially horizontal movement of the lifting head when the towing vehicle is backed under the forward end of the rear frame, a transversely guided bolt associated with the pocket for retaining the lifting head in the same, a control part supported on the said dumping body in a position to be engaged by a part of the rear frame, connected to the bolt, and operating to withdraw the bolt to permit the lifting head to move rearwardly into the pocket.

5. In a dumping truck apparatus of the kind described, the combination of a trailer having a frame with a dumping body supported thereon, said dumping body having a forward wall with a recess extending rearwardly into the same and having a pocket above the recess open on its forward side to receive a lifting head and take the thrust thereof, a towing vehicle having a fifth wheel, and a hoist including a substantially upright fluid-operated hoisting cylinder, and a lifting head adapted to pass into said pocket from the front when the towing vehicle is backed under the forward end of the truck frame; and movably mounted retaining means for retaining said lifting head in said pocket.

6. In apparatus of the kind described, the combination of a trailer frame, a trailer body movably supported on the frame and adapted to cooperate with a hoist at its forward end for raising the same to dump the load from the body, said trailer body having a forwardly disposed pocket to receive the lifting head of the hoist, locking means including a locking member means for guiding and moving the locking member transversely to the longitudinal axis of the trailer frame and across the said pocket to retain the upper end of the hoist in said pocket when the hoist raises the forward end of the trailer body, and means supported on the body adjacent the level of the bottom thereof for controlling the said locking means.

7. In apparatus of the kind described, the combination of a trailer frame, a dumping body movably supported on said frame and having a construction on its forward end adapted to cooperate with a lifting hoist for dumping the load from the said body, said construction including a pocket formed on the dumping body to receive the lifting head of the hoist, with side walls, locking means for retaining the lifting head in the pocket, and means movably mounted at the forward end of the trailer body for engaging said frame and connected with said locking means for holding the same in a withdrawn position when the trailer body is in its normal position, with means associated with the locking means for projecting the same across the said pocket when the forward end of the trailer body is raised by the hoist.

8. In apparatus of the kind described, the combination of a trailer frame, a dumping body movably supported on said frame and having a construction on its forward end adapted to cooperate with a lifting hoist for dumping the load from the said body, said construction including a pocket to receive the lifting head of the hoist with side walls, a draw bolt guided to slide transversely across the pocket and guided in said side walls, means movably mounted at the forward end of the trailer body for engaging said frame and connected with said draw bolt for holding the same in a withdrawn position when the trailer body is in its normal position, with means associated with the draw bolt for projecting the same across the said pocket when the forward end of the trailer body is raised by the hoist.

9. In dumping apparatus of the kind described, the combination of a towing vehicle having a rearwardly extending frame, a fifth-wheel mounted above the said frame and supported thereon, a hoist associated with the fifth-wheel, and including an extensible lifting head guided to move in a substantially vertical direction, a rear frame having means at the forward end for engaging the fifth-wheel to support the rear frame thereon, a dumping body mounted on the rear frame and having a forwardly disposed pocket open on its forward side adapted to receive the said lifting head by a substantially horizontal movement of the lifting head when the towing vehicle is backed under the forward end of the rear frame, and locking means in the form of a bar with means for guiding the same to slide transversely across said pocket in front of the lifting head when the same is located therein, and automatic means for operating the locking means to maintain the pocket open when the towing vehicle is backed into coupling position in front of the trailer.

10. In dumping apparatus of the kind described, the combination of a towing vehicle having a rearwardly extending frame, a fifth-wheel mounted above the said frame and supported thereon, a hoist associated with the fifth-wheel, and including an extensible lifting head guided to move in a substantially vertical direction, a rear frame having means at the forward end for engaging the fifth-wheel to support the rear frame thereon, a dumping body mounted on the rear frame and having a forwardly disposed pocket open on its forward side, adapted to receive the said lifting head by a substantially horizontal movement of the lifting head when the towing vehicle is backed under the forward end of the rear frame, locking means for retaining the lifting head in the pocket, a control member for the locking means, and means for mounting the control member so that it will engage a fixed part on the towing vehicle when the lifting head is in its low position so as to hold the locking member withdrawn; all of said parts cooperating to effect automatic advance of the locking bar when the forward end of the body is lifted by the hoist.

11. In apparatus of the kind described, the combination of a trailer frame, a dumping body movably supported on said frame and having a construction on its forward end adapted to cooperate with a lifting hoist for dumping the load from the said body, said construction including a pocket to receive the lifting head of the hoist, with side walls, locking means for retaining the lifting head in the pocket, and means movably mounted at the forward end of the trailer body for engaging said frame and connected with said locking means for holding the same in a withdrawn position when the trailer body is in its normal position, with means associated with the locking means for guiding the same transversely to the longitudinal axis of the trailer frame, and for projecting the same across the said pocket when the forward end of the trailer body is raised by the hoist.

AMOS H. KIRKSEY.

REFERENCES CITED

The following references are of record in the file of this patent:

UNITED STATES PATENTS

| Number | Name | Date |
|---|---|---|
| 1,523,249 | Blum | Jan. 13, 1925 |
| 1,588,396 | Winn | June 8, 1926 |
| 1,925,296 | Barrett | Sept. 5, 1933 |
| 2,022,387 | Reid | Nov. 26, 1935 |
| 2,045,647 | Helms | June 30, 1936 |
| 2,166,722 | Kirksey | July 18, 1939 |